INVENTOR
ROBERT M. MEADE
BY Carl C. Kling
ATTORNEY

Jan. 21, 1964 R. M. MEADE 3,119,098

STREAM EDITING UNIT

Filed Oct. 31, 1960 11 Sheets-Sheet 2

Jan. 21, 1964 R. M. MEADE 3,119,098

STREAM EDITING UNIT

Filed Oct. 31, 1960 11 Sheets-Sheet 3

Jan. 21, 1964 R. M. MEADE 3,119,098

STREAM EDITING UNIT

Filed Oct. 31, 1960 11 Sheets-Sheet 8

FIG. 9 FIRST ECHELON DATA SWITCH MATRIX

FIG. 11 EDIT GATE BLOCK
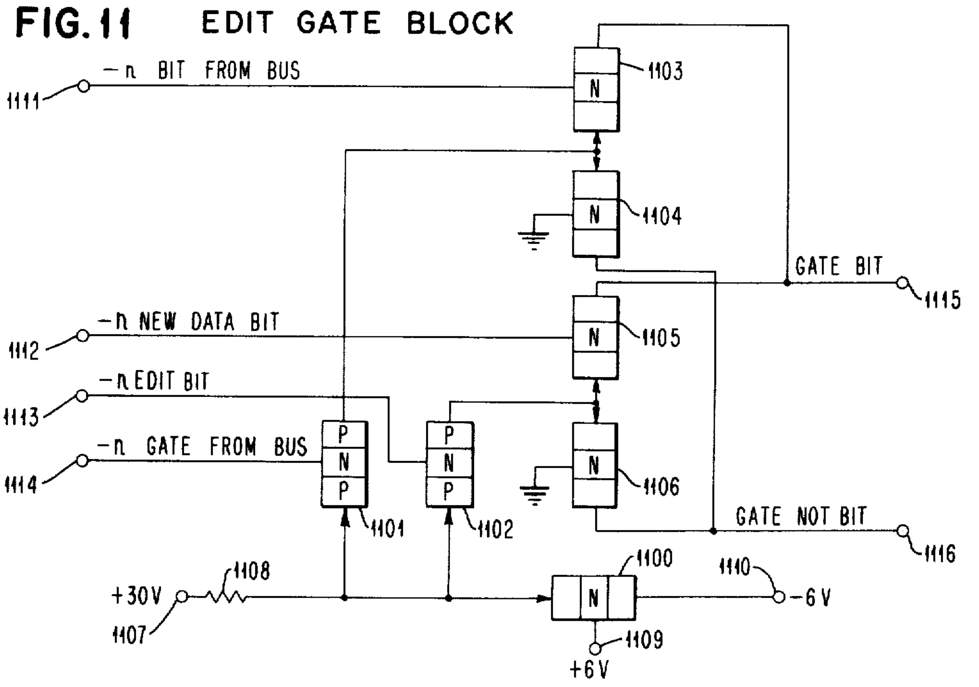
FIG. 12
SWITCH MATRICES
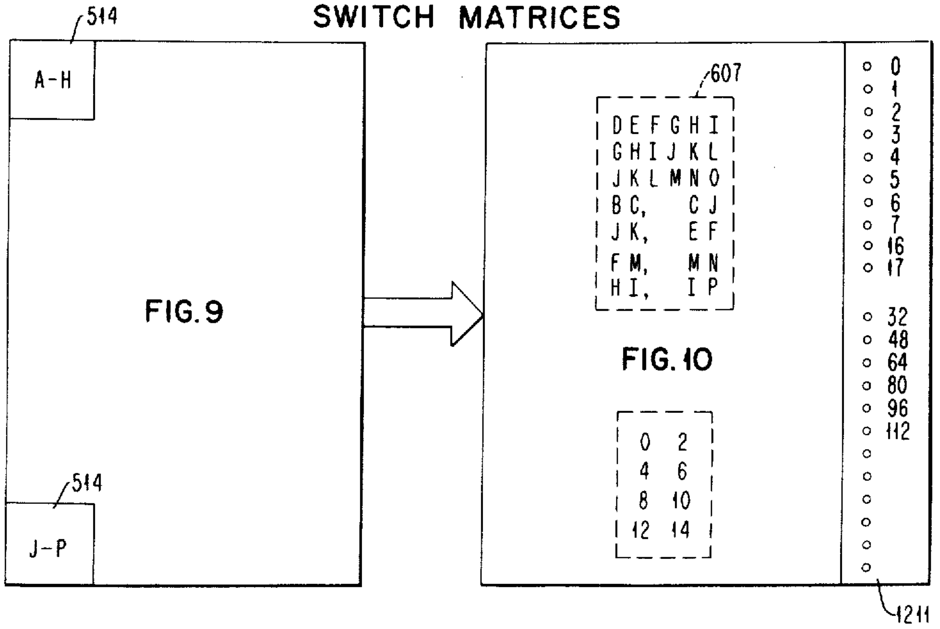

United States Patent Office 3,119,098
Patented Jan. 21, 1964

3,119,098
STREAM EDITING UNIT

Robert M. Meade, Wassaic, N.Y., assignor to International Business Machines Corporation, New York, N.Y., a corporation of New York
Filed Oct. 31, 1960, Ser. No. 66,251
17 Claims. (Cl. 340—172.5)

This invenion relates to data processing systems, and more particularly to a system for editing and assembling a stream of data bytes into data words.

Applicable data processing systems operate on bits, bytes and words. A bit is the smallest denominator of data; a bit value of 1 is an electrical manifestation while a bit value of 0 is a different electrical manifestation. Popular components are binary devices, transistors, diodes, etc., which can operate on a bit level by assuming one or the other of only two possible electrical states. A bit is either present (bit or 1) or absent (not bit or 0) and conveys information by its presence or absence. A byte is a group of bits. The byte in the preferred embodiment is normally eight bits, which can indicate, by the pattern of 1's and 0's, binary values 0–255, decimal values 0–9 for each of two binary coded decimal BCD digits, hexadecimal values 0–15 for each of two hexadecimal digits, a single alphameric character or other coded information. A word is a group of bytes which generally have significance with regard to each other, such as orders 1's, 10's, 100's, etc. in decimal numbers.

It is often advantageous to perform arithmetic operations at the byte level, and previously or subsequently to assemble a continuous stream of bytes into a multi-byte register for parallel transmission along a bus to other units or to memory. Since digital information must preserve accuracy, especially in higher orders of computation, parity check bits are often carried along with data bytes and data words. In an odd parity machine, for example, an eight-bit byte 11100111 presents a count of six 1's and two 0's and requires a 1 value parity bit to preserve odd parity. With parity, the data byte becomes 111001111.

In assembling a stream of data bytes into word configuration, it is often desirable to select certain positions within the data byte to be excluded from the word being assembled. Such selectivity is accomplished by a mask which may be under control of a byte similar to a data byte. Where the mask byte contains 0 bits, suitable controls can "mask," or prevent the associated positions of an incoming new data byte from becoming a part of the assembled word. Terminal masking, for example, can effectively reduce byte size from the usual eight bits to six, four or fewer bits.

It is desirable to maintain complete flexibility in the manner in which the continuous stream of incoming data bytes is assembled into words. It is desirable, for example, to place a new data byte at any position within the old data word or across a word boundary and to edit any number and pattern of bits within an old data byte to correspond, not to fixed values as under prior masking schemes, but to the variable values of the new data byte. It is necessary to maintain parity and to provide adequate checking devices.

Processes which provide for word boundary crossover, terminal masking and continuous byte streaming are being contributed by others to the art. The desirability of maintaining flexibility in a manner in which data is assembled is obvious. Error checking, various forms of which have become known, becomes increasingly valuable as editing data manipulations (and resultant chances for error) occur, but becomes increasingly difficult as flexibility of bit editing within the byte is provided.

Where bytes cross word boundaries, for example, the error hazard is increased. Perhaps because of error hazards, the prior art has not provided editing for a continuous byte stream.

The object of the invention is to edit a continuous stream of data bytes.

A second object is to accompany an editing operation with continuous checking.

A third object is to include parity prediction in an editing operation.

A fourth object of the invention is to assemble incoming new data bytes into words, with flexibility of byte positioning within the old data word and of bits within the byte.

A fifth object of the invention is to edit a previously assembled old data word by inserting, according to edit information, selected bits from an incoming new data byte while retaining old data bit values in unselected bit positions.

A sixth object of the invention is to provide complete checking mechanism to monitor the assembly of data bytes into a word.

A seventh object of the invention is to create bit-by-bit selectivity of choice between old data and new data according to an edit byte.

An eighth object is to provide an editing operation which selects old data or new data on a bit-by-bit basis according to an edit byte.

A ninth and more particular object is to detect errors in first and second decoder circuits which respectively depend and rely upon a particular bit in a control byte, such errors being immune to detection by parity checking, by producing in the first circuit a DEPENDENCE signal and in the second circuit a RELIANCE signal, each signal indicative of action based upon the particular bit, and checking the DEPENDENCE and RELIANCE signals for error mismatch.

A tenth object is to either retain or to replace the bit value in a selected position of a word register according to the value of a related edit bit.

A final object is to insert bit values and decode their destination in a minimum of logical stages and a minimum transistor count.

A feature of the invention is a parity predictor which produces parity bits for the two bytes in a data register group affected by a particular data entry, which entry may cross normal byte boundaries of the data register. The parity predictor is responsive to the old data bit values from the two-byte group of the data register, the new data bit values from an incoming two-byte group within which the new data byte is positioned, and the bit values of the incoming two-byte group within which the edit byte is positioned. The parity predictor produces two proper new parity bits regardless of the bit configuration of the two affected data register byte positions and with a standard minimum logical delay.

Another feature of the invention is the negative logic matrices made up of three-level logic OR circuits. These matrices provide for access to the data register by the bit values of the incoming data byte and edit byte as well as for positioning of the new data bit.

The foregoing and other objects, features and advantages of the invention will be apparent from the following more particular description of a preferred embodiment of the invention, as illustrated in the accompanying drawings.

In the drawings:

FIG. 1 is a block diagram of a STREAM EDITING UNIT incorporating the invention. All other figures relate to details of FIG. 1; reference characters in the block 101–199 refer to blocks in FIG. 1.

FIG. 2 is a functional diagram of FIRST ECHELON new data switch matrix 116 and related circuits which position a data byte selectively within a two-byte group according to a byte address register 101 setting. First echelon edit switch matrix 117, which identically positions an edit byte within the two-byte group, according to the identical byte address, is similar.

FIG. 3 is a functional diagram of SECOND ECHELON new data switch matrix 122 which positions the two-byte group including the positioned data byte to face a group of two adjacent byte areas of the data register according to the byte address register 101 setting. Second echelon edit switch matrix 123, which identically positions the two-byte group including the positioned edit byte to face the identical group of two adjacent byte areas of the data register according to the identical byte address, is similar.

Figure 6:
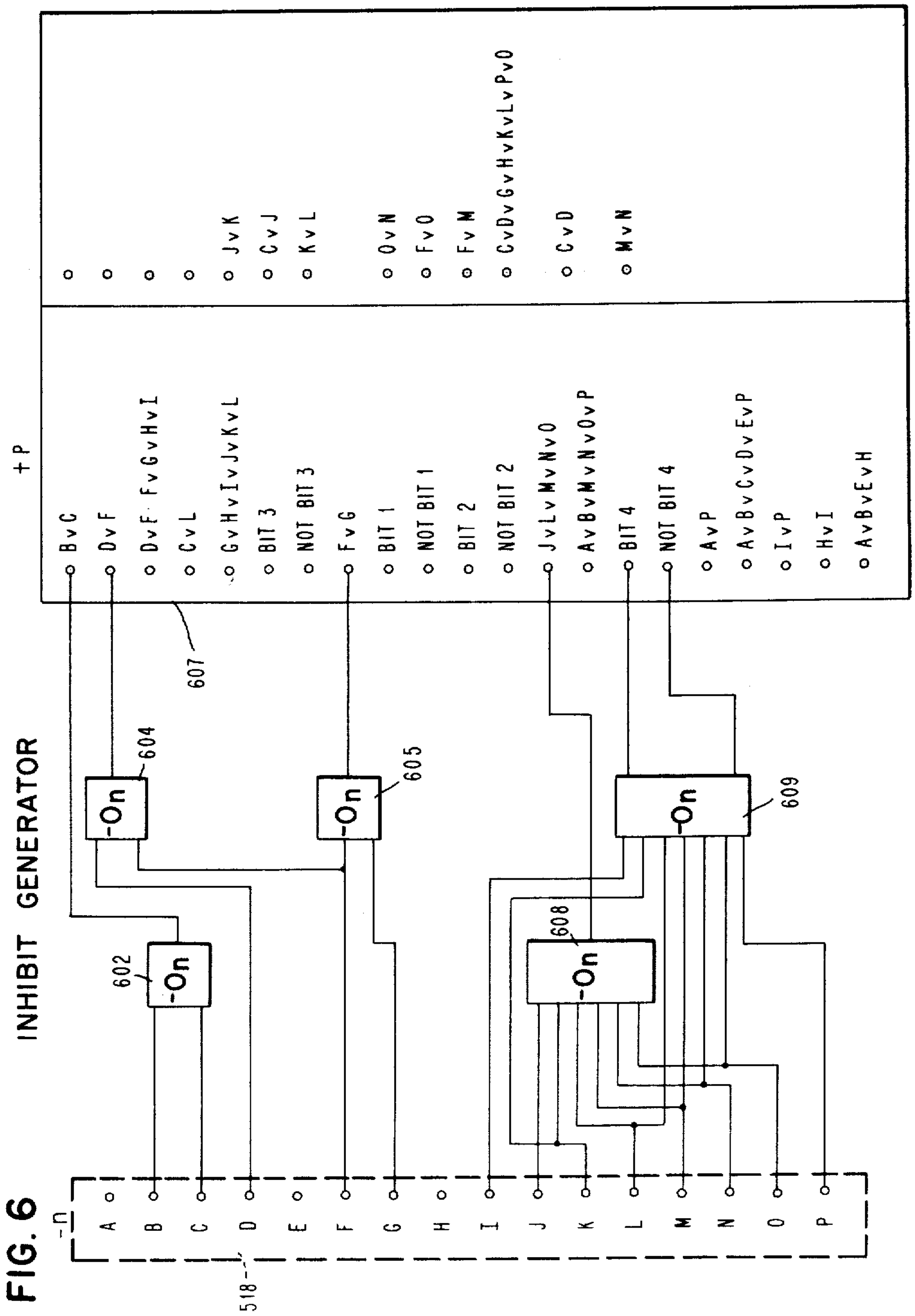

FIG. 6 is an illustrative circuit diagram of the INHIBIT GENERATOR 106 for the second echelon select switch matrix. Input signals A–P are combined to produce all required combinations. FIG. 6 also serves as encoder for the first echelon bit address check.

Figure 7:
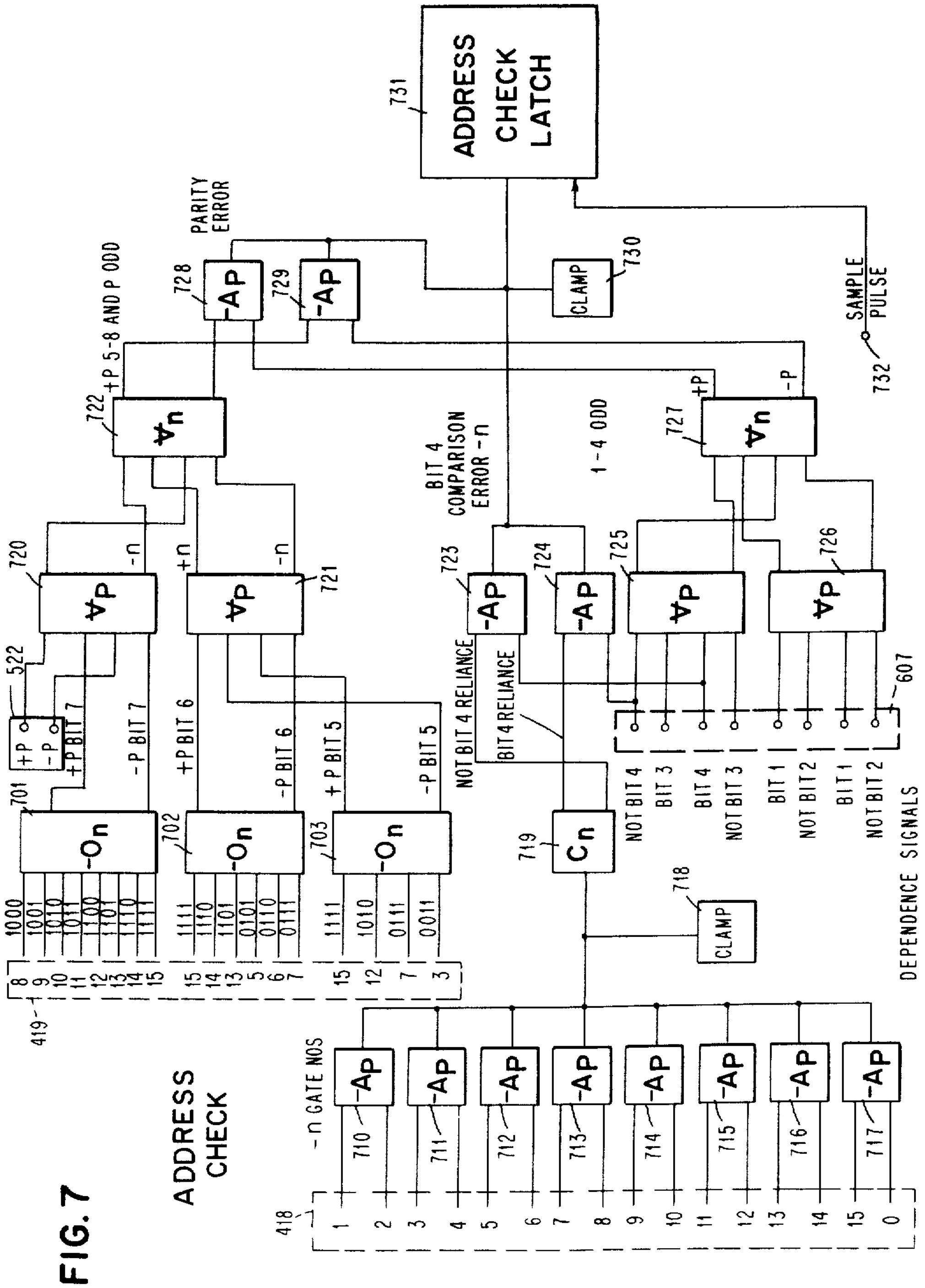

FIG. 7 is a circuit diagram of ADDRESS CHECK 108.

Figure 8:
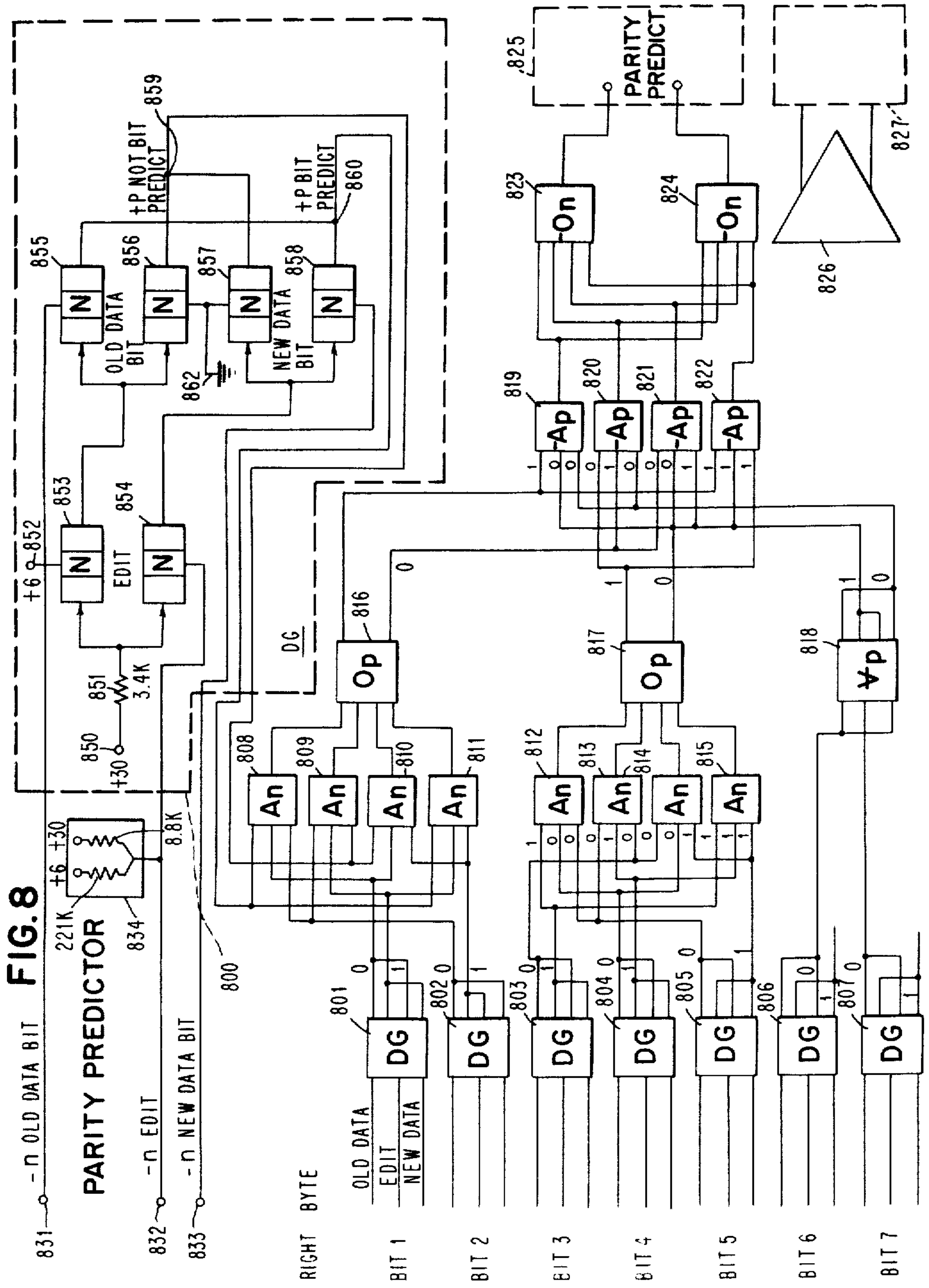

FIG. 8 is a circuit diagram of PARITY PREDICTOR 120.

Figure 9:
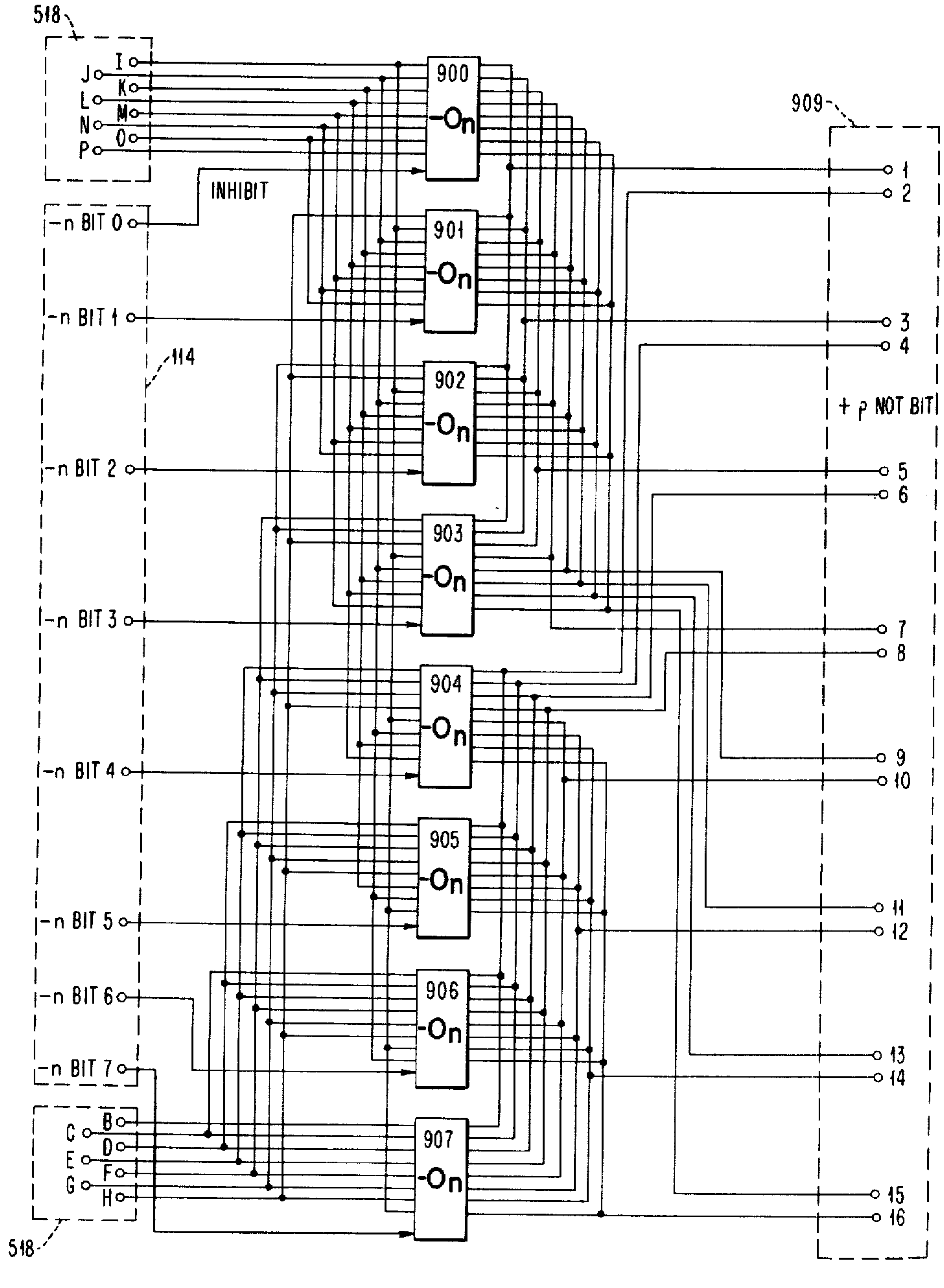

FIG. 9 is a circuit diagram of FIRST ECHELON DATA SWITCH MATRIX 116. First echelon select switch matrix 117 (not illustrated) is similar.

Figure 10:
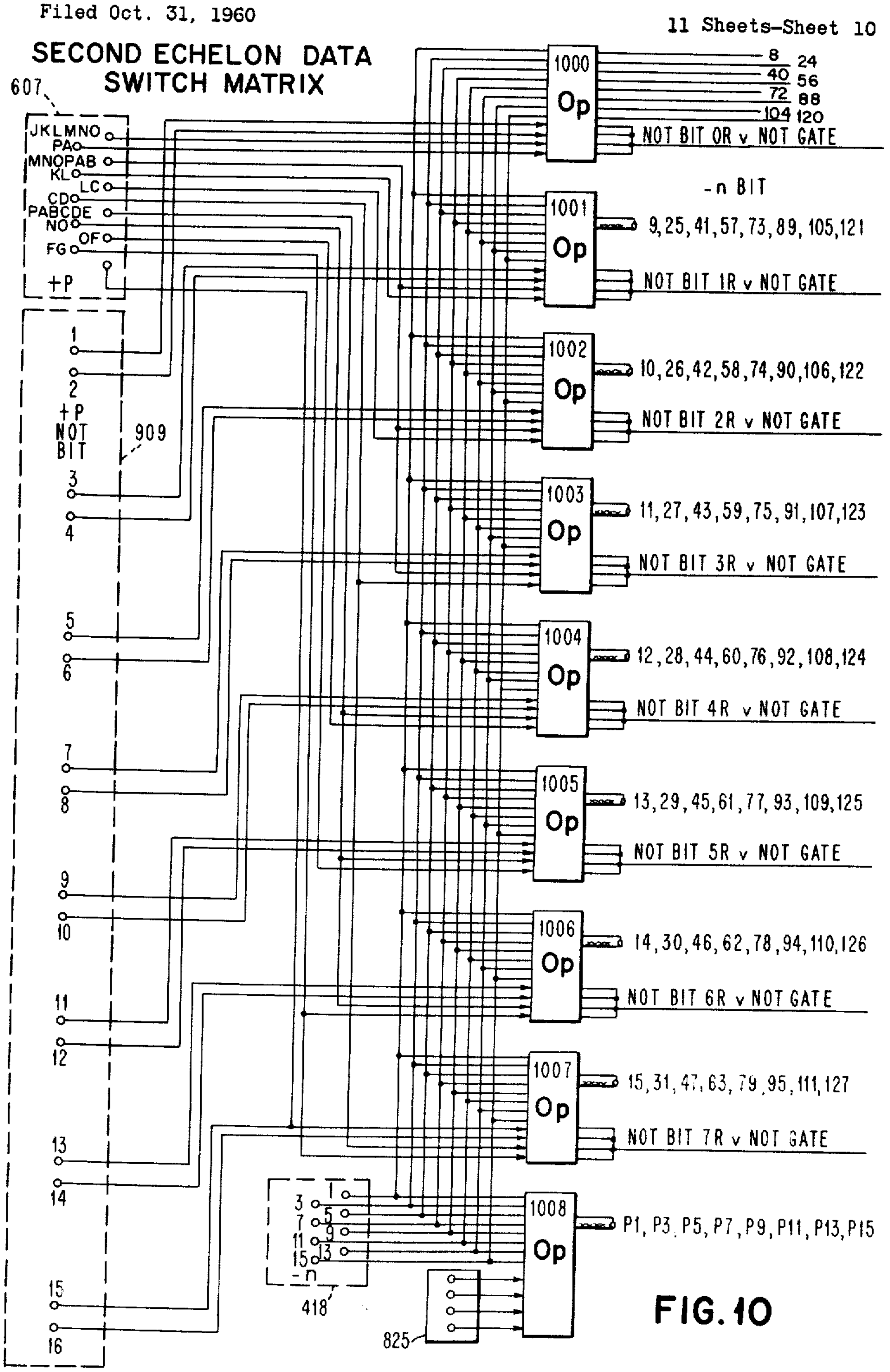

FIG. 10 is a circuit diagram of SECOND ECHELON DATA SWITCH MATRIX 122; second echelon switch matrix 123 (not illustrated) is similar.

FIG. 11 is a circuit diagram of one data register EDIT GATE BLOCK, where the gating of data from a data bus or from the data switch matrix under control of the edit switch matrix is implemented.

FIG. 12 is a block diagram of first and second echelon EDIT SWITCH MATRICES 117, 123.

*Summary*

An eight-bit byte from a new data byte register is read into a selected group of eight adjacent positions in a data register, with from zero to eight bits masked in a pattern called for by an eight-bit byte in an edit byte register. The pattern of 0-valued bits of the edit byte determines which data register positions are to remain unchanged by the new data. The pattern of 1-valued bits of the edit byte determines which data register positions are to be edited to correspond to respective new data bits. The selected byte address (seven bits) is available at a byte address register. Bits 1–4 are decoded by a 4–16 decoder onto sixteen lines which control first echelon data and edit switch matrices. Bits 4–7 are decoded by a 4–16 decoder onto sixteen lines which control second echelon data and edit switch matrices. Bit 4 is used in decoding for both first and second echelons. The first echelon switch matrices place an eight-bit byte in any adjacent eight positions of a sixteen-bit group relative to the data register. The sixteen-bit group is treated as a wrap-around cylinder with the leftmost bit adjacent to the rightmost; the data byte and edit byte are positioned identically for proper masking within the group. The second echelon switch matrices place the data byte containing group and the edit byte containing group in identical positions with respect to the data register; the data byte and edit byte remain aligned. The second echelon edit switch matrix selects the particular bits of a particular group in the data register for data entry.

A variable number of variable bit values (editing byte) is to be inserted within a designated group of positions in the data register, which group contains variable old data bit values. Parity prediction thus must be based on the old data, the new data, and the edit information. The two-byte group within which the editing byte is to be placed, together with the two associated parity bits, are read out from the data register via a matrix and group of latches to a parity predictor. The two groups, including respectively the data byte and edit byte similarly placed within the groups, are also fed to the parity predictor which produces two new parity designations, one for each byte in the group. The parity prediction bits are fed to the data register with the new data.

The system is completely checked. The use of bit 4 of the byte address for both first and second level decode necessitates a special check, since failure at certain points might fail to upset parity. Accordingly, both first and second echelon decoders are equipped to supply signals indicating action based on bit 4 values 1 or 0, which for clarity are called respectively reliance and dependence signals. The reliance and dependence signals are compared for a match (OK) or clash (error).

Three level logic is used to form a two-stage decoder which minimizes delay through the circuit.

FIG. 1—STREAM EDITING UNIT

The invention operates in the context of a continuous stream unit in which data bytes received eight bits in parallel are assembled into two data words each comprising eight eight-bit bytes (or a greater number of smaller bytes) and a parity byte for transmission in parallel.

In a typical editing operation on variable field length data (VFL edit) a system control unit broadsides old data into a data register from memory addresses specified. The size and placement of the bytes being variable, the old data word can be an array of bytes seriatim or may include gaps. Interspersed with or following the assembled old data word, new data is to be added to the old data word to accomplish the editing function. Once edited, the edited word can be broadsided to memory for storage or otherwise made use of.

System control unit 107 provides seven-bit plus parity byte addresses during editing to mesh the old data with the new data. The byte address in the preferred embodiment is a binary number of value equal to the position (0–127) of the leftmost bit being read into.

System control unit 107 provides indexing byte addresses to byte address register 101 to position the particular incoming new data byte with its leftmost bit at the selected position in the data register. Byte address bits 1–4 are presented to 4–16 decoder 102; byte address bits 4–7 are presented to 4–16 decoder 103. Bits 1–4 form a within-group position control cluster of signals which are amplified through the latches 104 for presentation to first echelon 8–16 data switch matrix 116 and edit switch matrix 117. Similarly, bits 4–7 are decoded as a cluster of signals designating "within data register" positioning, which are timed and powered through latches 105 for presentation to 16–128 second echelon switch matrices 122 and 123. Both the within-group cluster of signals from latches 104 and the within-register cluster of signals from latches 105 are applied to address check 108. A byte of new data, made available at new data byte register 112 by the system control unit through latches 114, is positioned within the sixteen-bit group controlled by new data switch matrix 116 responsive to the decoded bits 1–4 of the byte address. Similarly, edit bits from edit byte register 113, through latches 115, are positioned within the sixteen-bit group controlled by edit switch matrix 117 according to the byte address bits 1–4. The first echelon thus positions the data bit values of new data byte register 112 at a particular point within the sixteen-bit group; the edit bit values from edit byte register 113 it similarly positions within the sixteen-bit group. The data byte and edit bits are thus aligned.

Bit 4 controls both first and second echelons. When bit 4 is 0, there is no wraparound in the first level matrix since the amount of shift cannot be greater than 7 (the decimal value of 0111 in bits 4—3—2—1). Also, when bit 4 is 0, the first output of the second echelon decoder is an even number, since its binary low order is 0, regardless of other bit values (0000–1110). This preserves the alignment of the two byte positions affected by the editing operation.

When bit 4 is 1, a shift of at least 8 is called for in the first echelon matrix. This places the beginning of the byte into the rightmost selected byte and will cause a wraparound if any of the three low order address bits is 1. The byte is then split in the two-byte group, with part of its bits at the left end and part at the right end. The split-byte group is aplied to all group positions relative to the data register, so that the left end bit of one group is adjacent to the right end bit of the next. Decoding for the second echelon, however, is odd, when bit 4 is 1. This causes the second echelon to select the left byte of one group and the right byte of the adjacent group to enter the data register. This brings the byte back into a continuous field in the register, which field overlaps any byte, group or word boundaries which occur.

In the second echelon, the sixteen-bit group of signals from data switch matrix 116 is available to any one of sixteen possible sixteen-bit groups of data register 124 as selected by new data switch matrix 122. Similarly the edit byte is available to any of the sixteen groups of the data register via edit switch matrix 123. The second echelon switch matrices are controlled by bits 7–4 of the byte address as decoded by decoder 103 and timed by latches 105. All latches operate on a common sample pulse, essentially in parallel.

The effect of the mechanism described is, in the first echelon, to align a byte of new data and an edit byte within a group, and, in the second echelon, to align the group at a particular group position with respect to data register 124. The new data byte, as controlled by the edit byte, is applied to the data register at the position selected by the setting of byte address register 101. Data register 124 is generally divided into bytes and not into groups; each byte has an associated parity bit. Any two adjacent bytes can be considered as a group as far as the switch matrices are concerned; it can therefore be seen that it is possible for an editing new data byte being applied to the data register to be placed across a byte boundary in the data register and thus to affect parity within each of the two adjacent bytes of the group.

Parity predictor 120 provides parity predict bits simultaneously with the application of the editing new data to the data register. As second echelon switch matrices 122 and 123 are aligned with a particular group of two adjacent bytes in data register 124, the sixteen-bit group comprised of the two bytes is read out via old data switch matrix 125 via latches 126 from which the data is applied to parity predictor 120 simultaneously with the outputs of first echelon data switch matrix 116 and first echelon edit switch matrix 117.

Parity predictor 120, responsive to the old data, the new data and the edit information, produces two parity predict bits of proper values to retain parity in both bytes of the data register which are subject to change. Edit gate 121 passes editing data bits and parity predict bits to data register 124; it provides the timing point for the entire editing unit.

Parity check blocks 118, 119 and 127 provide continuous parity checking of the data as it moves through the system.

Data register 124 connects broadside by word to data bus 132; the data bus connects to edit gate 121. Data flow from the stream editing unit to memory or other sections of the system is via the data bus.

Figure 1:
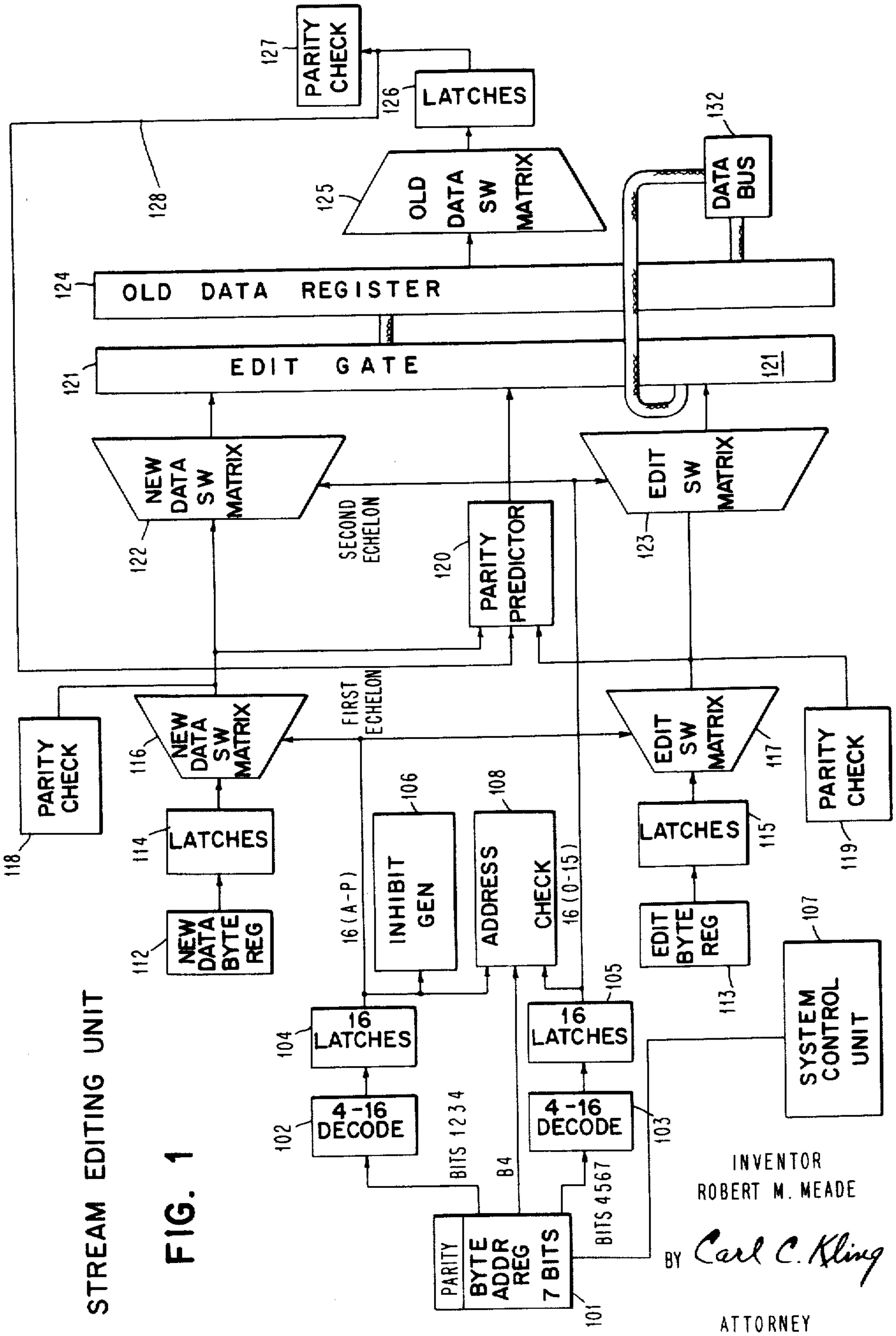

All other figures can be related to FIGURE 1, generally as providing additional details of functional blocks.

FIG. 2—FIRST ECHELON

Figure 2:
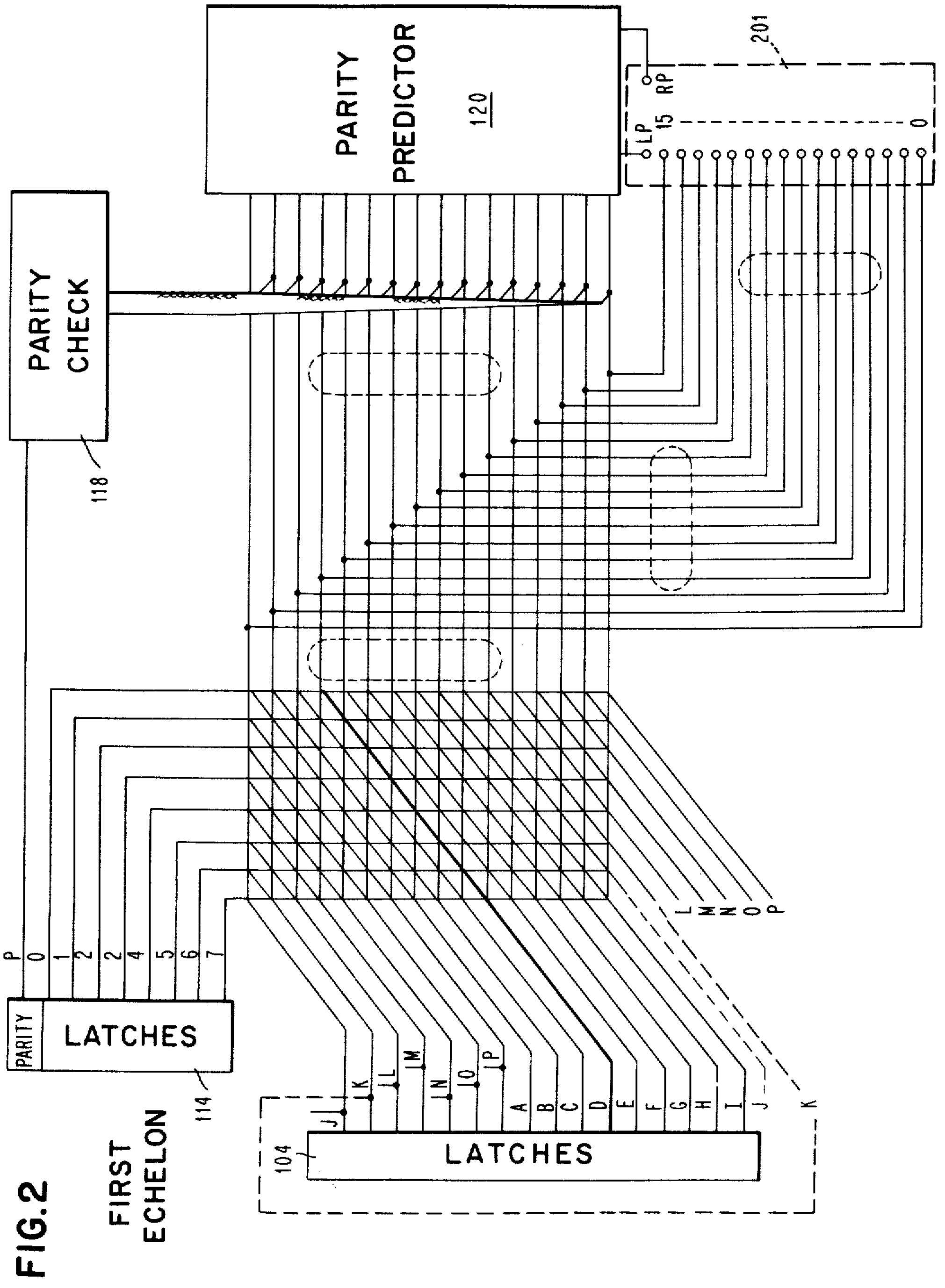

Latches 104 produce on sixteen lines A–P a byte pattern of eight adjacent bit positions. Latches 114 provide on eight lines 0–7 the bit values of the incoming data and a parity bit on a separate line. The bit values are positioned onto the eight bit lines selected by the conditioning of latches 104, and made available at terminals 201. The entire group of bit lines are presented to parity predictor 120 and together with the parity line to parity check 118. The effect of the circuit, as previously pointed out, is to position a data byte within a two-byte group. Edit switch matrix 117 (FIG. 1) and its associated circuits 113 and 115, which are in all respects similar to the equivalent circuits in the data switch matrix as shown in FIG. 2, position the edit byte within a two-byte group aligned similarly to the data byte in its two-byte group.

FIG. 3—SECOND ECHELON

Terminals 201 are conditioned according to the values of the new data byte, positioned within the group as explained in connection with FIGURE 2. The cluster of lines, which includes a data byte positioned within a group, is available to various group positions in the data register. Demonstrative positions 15—14 and 1—0 are shown; the relationships of the other groups are identical. Two adjacent bytes in the data register are selected by output signals from latches 105 in pairs at terminals 301; bytes 15 and 14, for example, can be selected, or bytes 14 and 13, or 6 and 5, etc. By selection of the pair of lines 15—14, the new data byte and edit byte containing groups are uniquely positioned at 15—14; any other position in the data register can similarly be selected, since the group containing the byte is available to all positions.

FIG. 4—SECOND ECHELON DECODE

Bits 7–4 are stored in triggers 401–404, which produce output signals as marked, +p or its complement —p and +n or its complement —n for the related bit values. The 1 value bit produces the signal as marked; the 0 value bit (not bit) produces complements of the signals as marked.

The details of a suitable latch are disclosed in copending patent application Serial No. 27,235, filed April 14, 1960; Transistor Circuits for Digital Computers, by the inventor herein and assigned to the same assignee. Bit 4 produces a +p signal at terminal 405 and a —p signal at terminal 406, when it is set to the 1 value, as well as +n on its top output line and —n at terminal 415.

—A*p* block 409 is responsive to NOT BIT 7 and NOT BIT 6 —p signals (complements of the BIT 7 and BIT 6 +p signals.) —O(n) blocks 411–414 provide decoding to sixteen lines labeled according to binary values assigned to bits 7–4. The lines each connect to a latch such as 416 for line 1111. Fifteen additional latches such as 417 accompany latch 416 to provide outputs at terminals 418 for decoded values 0–15.

FIG. 5—FIRST ECHELON DECODE

Bits 1–3 are stored in bit triggers 501–503 and bit 4 is stored in trigger 404 with signals available at terminals 405 and 406. Terminal 505, when conditioned by a +p signal from the system control unit, gates in sixteen bits rather than eight. This provides for a parallel transfer of sixteen-bit address fields, which during certain operations are handled much like data. The address field bits are made available from a register (not shown) to the latches. —A(p) blocks 508 and 509 and —O(n) blocks 510–513 provide decoding to sixteen lines labeled according to their binary values, which lines connect to respective latches such as 514, 515 and 516. The outputs of the latches are available at terminals 518 designated A–P. Latch 519, which is set by the +p address parity bit signals at terminal 506, is read out by a +n sample pulse at terminal 507 via C(n) block 520 to produce —p and +p address parity bit signals at terminals 522.

FIG. 6—INHIBIT GENERATOR

Figure 5:
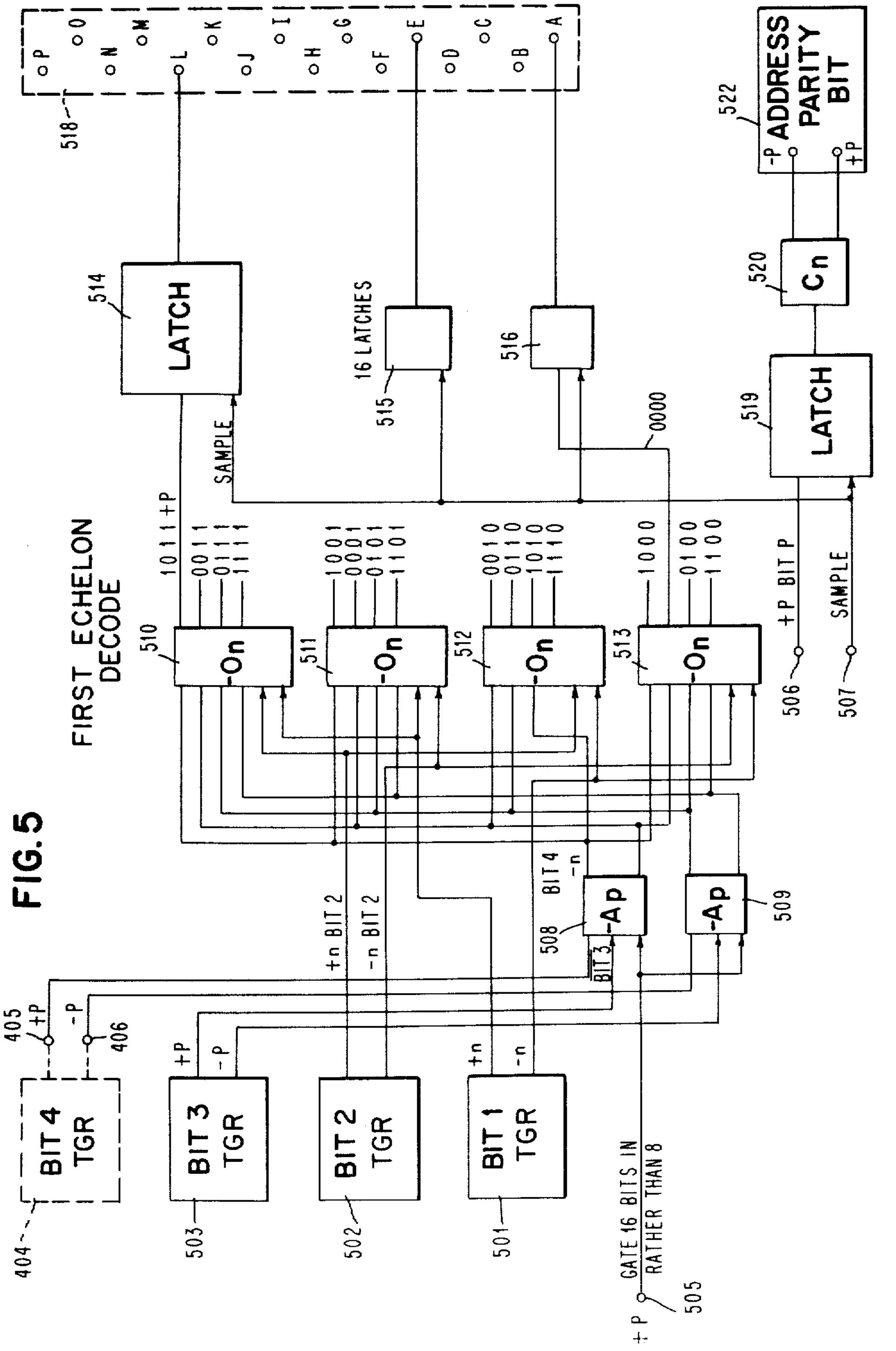
FIG. 5 is a circuit diagram of FIRST ECHELON DECODE circuits 101, 102, 104 for the first echelon data and select switch matrices.

Illustrated in abbreviated detail is the circuit for accepting signals A–P from terminals 518 of FIGURE 5 and producing desired signals at a set of terminals. —O(n) block 602, for example, is conditioned by either B or C to produce the BvC (B or C) signal at its appropriate terminal. —O(n) block 604 is similarly responsive to D or F signals; —O(n) block 605 to F or G signals. All —O(n) blocks connect to terminals 607. More complicated signals are produced by larger OR circuits such as 608 and 609. Complementing OR circuits such as 609 provide variations; all required combinations of signals A–P are produced and made available at terminal block 607. Block 609 has inputs for each signal which depends on BIT 4; it produces the BIT 4 dependence signal and its complement NOT BIT 4.

FIG 7—ADDRESS CHECK

The address check circuit provides a parity check upon the decoded address and, in addition, provides a check on the decoding of bit 4. Bit 4, being used twice in address decoding, is subject to a type of error which fails to upset parity. Accordingly, a special circuit is provided which indicates dependence on the presence of bit 4 in the data matrix by a BIT 4 DEPENDENCE signal and an additional circuit which provides RELIANCE signals based on bit 4 in the edit matrix, compares the DEPENDENCE and RELIANCE signals and provides an error signal when they are mismatched. By inductive reasoning, error is present when, of the two circuits whose action is dictated by bit 4, one relies on BIT 4 and the other depends on NOT BIT 4, or conversely.

Parity checking follows the standard format. —O(n) circuits 701, 702 and 703 provide ±p signals BIT 7, BIT 6, and BIT 5. These signals, together with ±p PARITY BIT signals, are processed by EXCLUSIVE OR networks 720, 721 and 722 to provide a parity indication for the four applicable bits. This parity indication is to be processed in exclusive or fashion with a similar parity indication for bits 1, 2, 3 and 4 to provide an error signal where total parity is improper. The generation of BIT 4 RELIANCE signals for testing involves —A(p) circuits 710–717, which are responsive to data addresses including the 4 bit, i.e., those including an odd numbered data register byte and its higher adjacent even numbered byte. Clamp 718 provides a reference voltage; C(n) block 719 provides a powered BIT 4 RELIANCE signal and its complementary NOT BIT 4 RELIANCE signal. The set of dependence signals is available from terminals 607. BIT 4 RELIANCE and BIT 4 DEPENDENCE signals from C(n) block 719 and from terminals 607 are applied to —Ap blocks 723 and 724. This provides a —n COMPARISON ERROR signal upon coincidence at —A(p) block 723 of signals NOT BIT 4 RELIANCE and BIT 4 DEPENDENCE or upon coincidence at —A(p) block 724 of signals BIT 4 RELIANCE and NOT BIT 4 DEPENDENCE. BIT 3, 2 and 1 DEPENDENCE signals from terminals 607 are processed via EXCLUSIVE OR networks 725, 726 and 727. —A(p) blocks 728 and 729 provide parity error —n signals respectively when both groups (5–7 and P) and (1–4) are odd and when both groups are even. Clamp 730 provides a voltage reference. ADDRESS CHECK LATCH 731, enabled by a sample pulse at terminal 732, indicates the error.

FIG. 8—PARITY PREDICTOR

The function of the parity predictor is to provide correct parity prediction bits for two adjacent bytes in data register 124 in response to old data remaining in the data register, new data arriving via the data switch matrix and edit mask information arriving via the edit switch matrix. Parity generation for the right byte of the two bytes affected is shown in detail; parity generation for the left byte, similar in every respect except for connections, is shown symbolically. Old data, edit and new data signals for bits 0–7 of the left byte are applied to DG blocks 800–807. DG block 800, for bit 0, is shown symbolically by dotted lines and also shown in complete detail. Other DG blocks are shown symbolically only. Each DG block 800–807 is effective during NOT EDIT to pass an old data signal corresponding to a 1 value in the data register at the respective bit positions. Conditioning of the edit line disables the old data path and enables the new data path. The following truth table applies:

| DATA | | EDIT | OUTPUT |
|---|---|---|---|
| New | Old | | |
| 0 | 0 | 0 | 0 |
| 0 | 0 | 1 | 0 |
| 0 | 1 | 0 | 1 |
| 0 | 1 | 1 | 0 |
| 1 | 1 | 0 | 1 |
| 1 | 1 | 1 | 1 |
| 1 | 0 | 0 | 0 |
| 1 | 0 | 1 | 1 |

The output of each bit predict DG block 800–802 is 0 or 1, depending upon whether or not the formula (OLD DATA and NOT EDIT or NEW DATA and EDIT) is satisfied. Since the above formula is the effective formula of data transmission to the data register, which transmission is to be explained in connection with FIGURE 11, the 1 value outputs of the DG blocks are used to produce a modulo 2 parity bit for the byte values which will be in the data register at the end of the transmission. DG blocks 800–802 provide inputs to A(p) blocks 808–811. A(n) block 808 is responsive to the 001 value of the octal group formed by bits 0–2. A(n) block 809 is responsive to 010 octal; A(n) block 810 to 001 octal and A(n) block 811 to 111 octal. The circuit formed of A(n) blocks 812–815 is similarly responsive to octal values of bits 3–5, providing inputs to O(p) block 817 which produces odd and even parity signals for the related octal group. The 1 (odd) and 0 (even) outputs of O(p) blocks 816 and 817 and the output of EXCLUSIVE OR block 818 provide an octal group which is applied to —A(p) blocks 819–822. —A(p) block 819 is reponsive to octal 001; —A(p) block 820 to octal 010; —A(p) block 821 to octal 100; and —A(p) block 822 to octal 111. Since odd parity is to be maintained, the output of any of the —A(p) blocks 819–822 is effective to condition, via an intervening —O(n) block 823 or 824, terminals 825 which connect to block 1008 in FIG. 10, to provide parity bits for the left byte. The parity predictor for the left byte, similar in every respect to that just described for the right byte, is shown merely as triangle 826 and terminals 827.

The details of bit predict DG block 800 are shown at the top of FIGURE 8. Terminal 850 is continuously supplied with +30 v. reference potential which is applied via 3.4K resistance 851 to the emitters of PNP transistors 853 and 854. Transistor 853 is permanently biased by a +6 signal at terminal 852. Transistor 854 is held slightly above the +6 v. by a 221K resistor to +6 and an 8.8K resistor to +30 in network 834; transistor 854 normally does not conduct. Transistor 853 is thus biased ON normally, connecting the +30 v. circuit to the emitters of transistors 855 and 856. Transistor 856 is normally forward biased by the grounded base to provide at point 859 the +p signal (0 value) NOT BIT PREDICT. A —n OLD DATA BIT signal at terminal 831 forward biases transistor 855 to provide a +p (1 value) BIT PREDICT signal at terminal 860. The voltage relationships are such that transistor 855, when forward biased, prevents appreciable current flow through transistor 856.

A —n EDIT signal at terminal 832 forward biases transistor 854, effectively cutting off transistor 853 to block its output circuit to the pair of OLD DATA BIT transistors 855 and 856. Transistor 854 connects the +30 v. circuit through itself to the emitters of the pair of NEW DATA BIT transistors 857 and 858. Transistor 857 has a grounded base which biases it normally for conduction when its emitter is conditioned via transistor 854. Transistor 857 output at point 859 is the +p (0 value) NOT BIT PREDICT signal. A −n NEW DATA BIT signal at terminal 833 forward biases transistor 858, which effectively blocks output from transistor 857, and provides at point 860 the +p (1 value) BIT PREDICT signal.

In summary, the DG block operates as follows:

*State 1 (no input).*—Connection is provided from +30 v. terminal 850 via resistance 851, transistor 853, transistor 856, to provide a +p NOT BIT PREDICT signal at point 859.

*State 2 (−n OLD DATA signal only).*—Connection is provided from plus 30 v. terminal 850 via resistance 851, transistor 853, transistor 855 (forward biased by the −n OLD DATA BIT signal at terminal 831) to provide +p BIT PREDICT signal at point 860.

*State 3 (−n EDIT only).*—Connection is provided from +30 v. terminal 850 via resistance 851 and transistor 854 (forward biased by the −n EDIT signal at terminal 832) through transistor 857 to provide a +p NOT BIT PREDICT signal at point 859.

*State 4 (−n EDIT and NEW DATA BIT signals).*—Connection is provided from + 30 v. terminal 850 via resistance 851 and transistor 854 (forward biased by the −n EDIT signal at terminal 832) through transistor 858 (forward biased by the −n NEW DATA BIT signal at terminal 833) to provide a +p BIT PREDICT signal at terminal 960.

FIG. 9—FIRST ECHELON DATA SWITCH MATRIX

The byte of new data from latches 114 appears as −n signals on the supervisory inputs of —O(n) blocks 900–907. Negative logic is followed; the effect of the presence of a particular bit (BIT −n signal) is to inhibit its related —O(n) block. For example, the −n BIT 2 signal from latches 114 prevents —O(n) block 902 from passing a signal G–N which might otherwise pass to terminals 909. The output conductors of blocks 900–907 form "WIRE OR" circuits to terminals 909, which contain +p values when one of the connected —O(n) blocks is conditioned by +n NOT BIT when gated. It also contains +p when there is no —O(n) gated to it, through the action of the inhibit generator. These conductors will contain −p values only for the coincidence of a bit and gate in a particular —O(n). By a process of elimination, all terminals other than those related to a (BIT and Gate) condition lose their −p values, leaving the positioned data byte as +p NOT BIT signals.

The purpose of the circuit is to position the eight-bit data byte within the sixteen output positions. The positioning is accomplished by one stage of logic through application of the bit signals to the supervisory inputs of three level —O(n) blocks described in the copending applications of M. S. Schmookler for "Three Level Logical Circuits," Serial No. 22,289, filed April 14, 1960, and for a "Decoding Circuit," Serial No. 22,179, filed April 14, 1960, now Patent No. 2,994,852 which are assigned to the same assignee as this invention.

FIG. 10—SECOND ECHELON DATA SWITCH MATRIX

The data byte appears as +p NOT BIT signals positioned within a group at terminals 909. These signals are connected to supervisory inputs of O(p) blocks 1000–1008. Because of the polarity difference between first and second echelons, the +p signals inhibit the O(p) blocks.

Blocks 1000–1008 pass −n bit signals to the respective positions of edit gate 121 as marked. Where no logical input is conditioned with the appropriate bit signal, the lower output is conditioned. For example, should O(p) block 1000 have no logical conditioning for a bit at a related position (9, 25, 41, 57, 73, 89, 105, 121) its lower output NOT BIT O R v NOT GATE is conditioned. These outputs condition Parity Check 118 and Parity Generator 120.

FIG. 11—EDIT GATE BLOCK

Transistors 1100–1106 provide inputs to particular related stages of data register 124. Terminal 1107 provides a +30 v. via resistance 1108 to the emitters of transistors 1100–1102. A +6 v. supply at terminal 1109 provides permanent bias to transistor 1100; 1110, connected to a −6 v. source, provides a normal current path for the circuit, during periods between settings of the data register.

Terminals 1111–1114 provide −n inputs respectively for BIT FROM BUS, NEW DATA BIT, EDIT and GATE FROM BUS. The data input circuit provides a +p GATE BIT signal at terminal 1115 for situations where a 1 bit is to be set from the bus or where the information in the data register is to be replaced by a 1 bit. A +p NOT GATE BIT signal appears at terminal 1116 for situations where a 0 in the data register stage is to be set from the bus, or where a data bit is to be replaced by 0 from the data switch matrix. The decision whether to retain old data or replace with new data is under control of the aligned edit byte bit, which provides at terminal point 1113 a −n EDIT signal or its complement (+n NOT EDIT.) The system control unit provides, when applicable, a −n GATE FROM BUS signal. This forward biases transistor 1101 to provide connection from +30 v. terminal 1107 via resistance 1108 and through transistor 1101 to the emitters of transistors 1103 and 1104. Grounded base transistor 1104 is biased for normal conduction to condition terminal 1116 with a +p NOT GATE BIT signal. A −n BIT FROM BIT signal applied to terminal 1111 biases transistor 1103 for conduction, which conduction destroys the bias of transistor 1104, cutting it off, and conditions terminal 1115 with a +p GATE BIT signal.

Similarly, an EDIT signal at terminal 1113 conditions transistor 1102 to provide connection from +30 v. terminal 1107 to the emitters of transistors 1105 and 1106. Transistor 1106 normally conducts to condition terminal 1116 with the +p GATE NOT BIT signal; a −n NEW DATA BIT signal at terminal 1112 conditions transistor 1105 to conduct, cutting off transistor 1106 and conditioning terminal 1115 with the +p GATE BIT signal.

FIG. 12—SWITCH MATRICES

The data switch matrices of FIGS. 9 and 10 provide access to the right bytes of two-byte groups in the data register; FIG. 12 shows connections to provide access to the left bytes of two-byte groups in the data register. Differences of input are shown by characters in boxes within the blocks; for example, the first echelon matrix (right byte) shown in FIG. 9 does not use the input "A," the first echelon matrix (left byte) in FIG. 12 does not use input "I." Inhibit generator inputs from terminal 607 correspond to those for the right byte shown in FIG. 10.

Edit switch matrices are identical to the data switch matrices with the exceptions of input and output.

Input connection is from EDIT BYTE REG 113 via latches 115; output connection is to terminals 1113 and 1114 (FIG. 11) of EDIT GATE 119.

*Example of Operation*

Operation of the entire stream editing unit, in the form of an example, is as follows:

| | | |
|---|---|---|
| Byte Address | | 0 0 0 0 0 1 1 |
| New Data Byte | (1) | 1 1 0 1 1 0 1 1 |
| Edit Byte | (1) | 0 0 0 0 1 1 1 1 |
| Old Data Group (0-15) | | 1 0 1 0 1 0 1 0 1 0 1 0 1 0 1 0 |
| | | P1=1 P0=1 |

It is desired to edit positions 7–10 (doubly underlined) to the value 1011 specified by the settings of the new data byte register portions corresponding to the 1's in the edit byte register. The old data group, so edited, becomes edited old data group:

1 0 1 0 1 0 1 1 0 1 1 0 1 0 1 0

P0 P1

P0 must be set to 0 to reflect the changed settings of bits in the left byte. P1, reflecting a double change, remains at 1. The parity predictor must produce a NOT PARITY PREDICT signal for the left byte and a PARITY PREDICT signal for the right byte.

Bit 4 of the address register is 0. Reliance and Dependence signals must match.

The old data group must be read out to the parity predictor. The edit gate must pass the editing portion of the new data byte to the data register.

Figure 3:
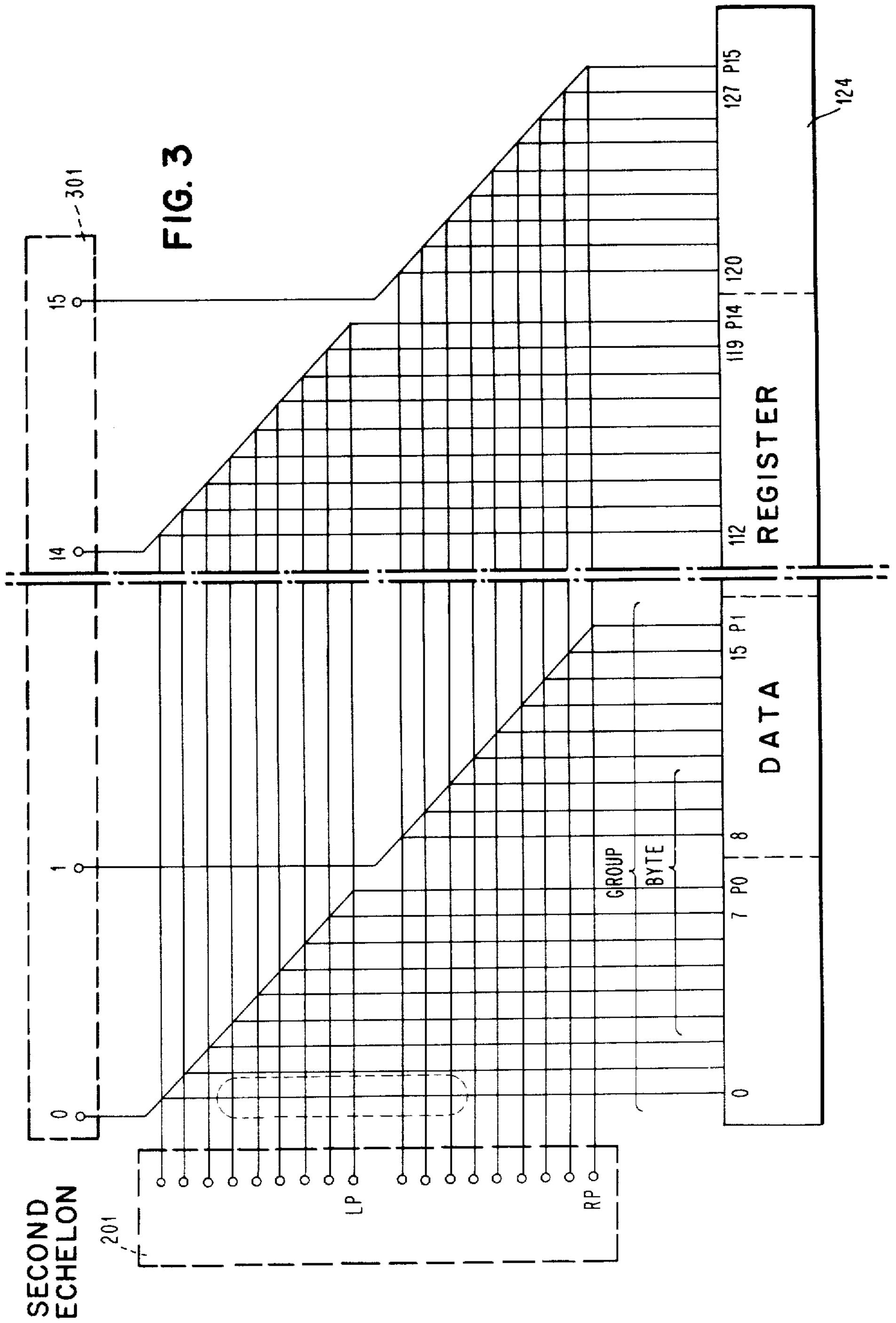

In FIG. 2, latches 114, standing disabled, pass the new data byte (1) 1 1 0 1 1 0 1 1 to respective lines P, 0, 1 . . . 7. Latches 104, standing disabled, pass function D along the diagonal for a shift of 3, which positions the new data byte within the two-byte group. The edit byte is similiarly positioned:

x x x 1 1 0 1 1 0 1 1 x x x x x new data group
x x x 0 0 0 0 1 1 1 1 x x x x x edit information group
x x x x x x x 1 0 1 1 x x x x x editing group
1 0 1 0 1 0 1 0 1 0 1 0 1 0 1 0 old data group
LP=1 RP=1 old data parity bits
1 0 1 0 1 0 1 1 0 1 1 0 1 0 1 0 edited old data group
LP=0 RP=1 parity predict bits In FIG. 3, the editing group is applied to the old data group, together with the parity predict bits. The old data group is thus edited as tabulated above. The example is illustrated by balloons marking affected lines in FIGS. 2 and 3.

Figure 4:
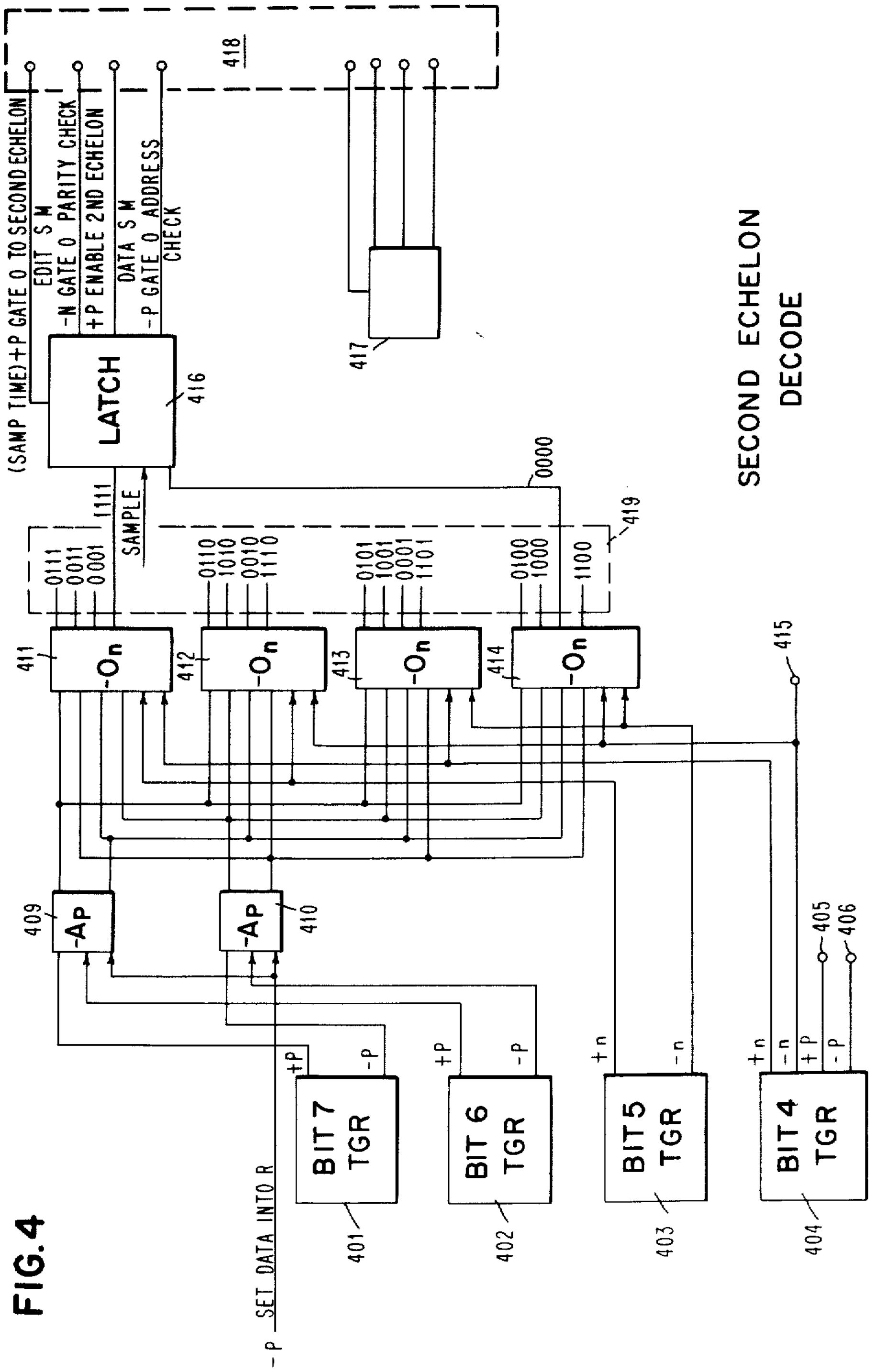
FIG. 4 is a circuit diagram of SECOND ECHELON DECODE circuits 101, 103, 105 for the second echelon data and select switch matrices.

In FIG. 4, bits 4–7 (0000) of the address condition line 0000. Line 1111 is deconditioned, but latch 416, which is responsive to 0000 or 1111, produces the 0 output. Since the data register wraps around, byte 0 is to the left of byte 15. Two latches in the second echelon pass signals at this time, the 0 latch 416 (0000—1111) and the 1 latch (not shown—0000—0001.)

In FIG. 5, the first echelon decode signal 0011 is available as the output from —O(n) block 510. The 0011 connects to terminal D in terminal board 518, providing the D function on the diagonal in FIG. 2. The actual D signal connects in FIG. 6 to —O(n) block 604 and others to condition with +P the following terminals of board 607:

DvE
DvEvFvGvHvI
NOT BIT 3
BIT 1
BIT 2
NOT BIT 4
AvBvCvDvEvP
CvDvGvHvKvLvPvO

In FIG. 7, none of the address check —A(p) blocks 710–717 is affected, since, in the example, bit 4 is 0. There is no wrap-around in the first echelon positioning; NOT BIT 4 RELIANCE is conditioned. The signals at terminals 413 always appear in pairs; the NOT BIT 4 RELIANCE pairs 0—1, 2—3, 4—5, 6—7, 8—9, 10—11, 12—13 and 14—15 require no circuits other than the C(n) block 719 for checking the lack of reliance upon bit 4. The NOT BIT 4 terminal 607 of FIG. 6 is conditioned. In FIG. 7, neither —A(p) block 723 nor 724 is conditioned, since the NOT BIT 4 RELIANCE and NOT BIT 4 DEPENDENCE signals do not mismatch. There is no error. There is no parity error either; address check latch 731 is not affected.

In FIG. 8, the parity predictor right half receives:

1 0 1 0 1 0 1 0 old data
1 1 1 x x x x x edit
0 1 1 x x x x x new data

Block 800 terminals 831, 832 and 833 are respectively conditioned 110. Transistor 854 is conditioned by the edit bit, conducting the +30 signal to the emitters of transistors 857 and 858. Transistor 857 conducts, (transistor 858 remaining deconditioned by the 0 new data bit) producing the +P not bit predict signal at point 859. Bit predict blocks 800–807 produce the pattern "01101010," which requires a 1 parity bit. A(n) blocks 810 and 814 are conditioned as is Exclusive Or block 813. O(p) blocks 816 and 817 are conditioned; —A(p) block 822 is conditioned, conditioning both —O(n) circuits 823 and 824 to provide the +p parity predict bit to the right byte of each group of the data register. The edit gate selects the group within the data register.

In FIG. 9, the new data byte is positioned (for the right byte) with a shift of 3. The byte appears as —n signals for bits 0, 1, 3, 4, 6 and 7, which disable —O(n) blocks 900, 901, 903, 904, 906 and 907, respectively. Shift input D in lower left terminals 518 is effective. —O(n) block 905 is the only block with a D input remaining enabled; it conditions terminal 2 via the wire OR circuit.

In FIG. 10, the signal on terminal 2 (board 909) disables O*p* block 1000, which conditions the NOT BIT OR line. Blocks 1001–1008 are not disabled. Group 1 terminal in board 518 is conditioned to select 0–15 positions as the old data group in the data register.

Inhibit signals at terminals 607 are the OR function of the following:

C D

P A B C D E

The C D signal inhibits blocks 1003 and 1007. The P A B C D E signal inhibits blocks 1004, 1005 and 1006. Block 1000 is inhibited by the +p NOT BIT signal from terminals 909.

Blocks 1001 and 1002 survive the inhibit barrage, conditioning position lines 9 and 10 respectively with —n BIT signals. Blocks 1000, 1003, 1004, 1005, 1006, 1007 and 1008 provide NOT BIT 0, 3, 4, 5, 6, 7 and 8 signals on their drain outputs. These NOT BIT signals are converted by means not shown to —n BIT signals; their complements are +n NOT BIT signals.

The —n signal BIT signal from the lower output of O(p) block 1000 connects to terminals 833 as previously explained. Other signals reflecting the left byte, the edit group right and left bytes, and the old data group also condition inputs to the sixteen positions of the parity predictor. Block 1008 provides a path for the P1 bit, which is the Parity Predict bit produced by the parity predictor.

FIG. 11 can be assigned position 8, which is the high order position of the 0–1 group right byte, and is to be changed from 1 to 0. The 1 entered the register position earlier via —n signals BIT from BUS at respective terminals 1111 and 1114 during the old data loading cycle.

The change occurs as the +n complement of the —n NEW DATA BIT signal at terminal 1113 blocks transistor 1104, and the —n EDIT BIT signal conditions transistor 1102, providing a current path through grounded base transistor 1105 to GATE NOT BIT terminal 1116. Other positions of the data register bytes 0 and 1, and partiy positions P0 and P1 are similarly set.

While the invention has been particularly shown and described with reference to a preferred embodiment thereof, it will be understood by those skilled in the art that various changes in form and details may be made therein without departing from the spirit and scope of the invention.

What is claimed is:

1. A data editing unit having a data register, a byte address register and editing means responsive to the settings in said byte address register to provide access to a selected group of continuous byte areas in the data register, said editing means comprising:

(*a*) data switch matrix means to apply a new data byte to the position in said data register specified by the settings in said byte address register;

(*b*) edit switch matrix means to position an edit byte identically with the positioning of the new data byte;

(*c*) readout means to read out settings from a selected old data group of data register positions which includes the positions selected for byte entry;

(*d*) a parity predictor responsive to the new data byte, the edit byte, and the old data group to provide parity prediction bits to said data register;

(*e*) and an edit gate responsive to the edit byte, new data byte and parity prediction bits, to enter edit data and parity prediction bits into the selected group of data register positions.

2. A data editing unit according to claim 1, wherein said parity predictor comprises:

a plurality of bit predict blocks, related respectively to each bit position in a group, each having connections for signals OLD DATA BIT, NEW DATA BIT and EDIT and connections for outputs NOT BIT PREDICT and BIT PREDICT, said output connections being conditioned during deconditioning of the EDIT connection according to the conditioning of the OLD DATA BIT connections and being conditioned during conditioning of the EDIT connection according to the conditioning of the NEW DATA BIT connection, and modulo circuit means responsive to outputs of said plurality of bit predict blocks for producing PARITY PREDICT signals.

3. A data editing unit according to claim 2 wherein said bit predict block comprises:

a current source; a NOT BIT PREDICT terminal; a BIT PREDICT terminal; three pairs of complementary not function and function transistors related to the functions EDIT, OLD DATA BIT and NEW DATA BIT; bias means associated with the not function transistor in each pair to provide normal conduction of a not function signal; control means connecting function signals EDIT, OLD DATA BIT and NEW DATA BIT to respectively related function transistors;

connection means connecting said EDIT pair to provide a series path from the current source to the OLD DATA BIT pair when the EDIT function signal is deconditioned in said control means and to provide a series path from the current source to the NEW DATA BIT pair when the EDIT function signal is conditioned; the relationships of said bias means, control means, not function transistors and function transistors being such that conduction of the function transistors effectively halts conduction of the not function transistors;

not bit predict means connecting the not function transistors of the NEW DATA BIT and OLD DATA BIT pairs to said NOT BIT PREDICT terminals;

and bit predict means connecting the function transistors of the NEW DATA BIT and OLD DATA BIT pairs to said BIT PREDICT terminal.

4. A data editing unit according to claim 1 wherein said edit gate comprises:

a plurality of edit gate blocks, one for each position of said data register: each block having a power source; a drain transistor; bias means to bias said drain transistor for normal conduction; function transistors related to the functions GATE BUS and EDIT; two pairs of complementary not function and function transistors BUS BIT and NEW DATA BIT; a GATE BIT terminal; a GATE NOT BIT terminal; control means connecting the function transistors of said BUS BIT pair and said NEW DATA BIT pair for conditioning by the related signals; bias means for conditioning the not function transistors for conduction; the relationships between said control means, bias means, function transistor and not function transistor being such that conduction of the function transistor effectively halts conduction of the not function transistor; bit gate means connecting the function transistors of the BUS BIT and NEW DATA BIT to said GATE BIT terminal; and not bit gate means connecting the not function transistors to said GATE NOT BIT terminal.

5. A data editing unit according to claim 1, wherein said data switch matrix means comprises:

a first echelon of three level logic NEGATIVE OR blocks, one for each bit position, each having a plurality of logical inputs, a supervisory input, and a plurality of logical outputs which follow related logical inputs according to the logic of the block when enabled by the supervisory input data position control means introducing control signals to said logical inputs; data byte applying means introducing complements of the applicable data bytes to the respective supervisory inputs; a group of first echelon terminals; and logical OR means connecting said NEGATIVE OR blocks to said first echelon terminals, whereby said group of first echelon terminals are individually conditioned or deconditioned according to the settings and positioning of the data byte within the data group;

and a second echelon of three level logic OR blocks, each block relating to similar relative positions within a plurality of data register groups, each block having a plurality of logical inputs respectively relating to specific data register group positions, a plurality of supervisory inputs, a plurality of logical outputs relating respectively to specific data register positions, and a drain; data position control means introducing control signals to said logical inputs and to certain of said supervisory inputs; first echelon signal applying means connecting said first echelon signals to supervisory inputs of related second echelon OR blocks, whereby said second echelon logical outputs provide new data bit signals to said edit gate according to the conditioned settings and positioning of the new data byte with respect to the data register and said second echelon drain outputs conduct according to the deconditioned settings and positioning of the new data byte or the NOT GATE condition.

6. A data editing unit according to claim 1 wherein said editing means utilizes a particular double-duty bit of the address byte to control a plurality of circuits, and wherein said editing means includes first echelon data parity check means, first echelon edit parity check means, data register group parity check means and address check means, comprising:

dependence signal means as a portion of a first circuit responsive to the double-duty bit, for producing DEPENDENCE and NOT DEPENDENCE signals relative to the double-duty bit; reliance signal means as a portion of a second circuit responsive to the double-duty bit for producing RELIANCE and NOT RELIANCE signals relative to the double-duty bit; an error trigger and means responsive to a mismatch of said DEPENDENCE and RELIANCE signals for setting said error trigger.

7. A data editing unit comprising:

(*a*) a data register which may contain old data and into which new data is to be assembled according to edit and address information;

(*b*) a byte address register for specifying the location within said data register at which a new data byte is to be placed;

(*c*) a byte source;

(*d*) an edit information source;

(*e*) first echelon means responsive to the settings in said byte address register for directing the settings of said byte source and of said edit mask source to selected identical positioning within a new data group and within an edit group;

(*f*) second echelon decoding means subject to the settings of said byte address register for selecting the group of bit positions in said data register to be affected by the data byte and edit information containing groups;

(*g*) readout means for reading out the old data settings from the selected group of data register positions;

(*h*) a parity predictor jointly responsive to the settings of said new data group, edit mask groups and old data group to provide parity predictions for the edited group;

(*i*) and an edit gate for entering the edited group and parity predictions into said data register.

8. A data editing unit according to claim 7, wherein said parity predictor comprises:

a group of bit predict blocks, each having an OLD DATA BIT input, and EDIT input, a NEW DATA BIT input, a NOT BIT PREDICT output and a BIT PREDICT output, and modulo circuit means connected to said BIT PREDICT and NOT BIT PREDICT outputs for producing PARITY PREDICT signals for the edited group.

9. A data editing unit according to claim 7 wherein said bit parity predict block 800 comprises:

a current source 850; a NOT BIT PREDICT terminal 859; a BIT PREDICT terminal 860; and three pairs of complementary not function and function transistors related to the functions EDIT, OLD DATA BIT and NEW DATA BIT; bias means 852, 862, associated with the not function transistors 853, 855, 857 in each pair to provide normal conduction of a not function signal; control means 831–833 connecting function signals EDIT, OLD DATA BIT and NEW DATA BIT to respectively related function transistors 854, 856, 858;

connection means connecting said EDIT pair 853–854 to provide a series path from the current source 850 to the OLD DATA BIT pair 855–856 when the EDIT function signal is deconditioned in said control means and to provide a series path from the current source 850 to the NEW DATA BIT pair 857–858 when the EDIT function signal is conditioned; the relationships of said bias means, control means, not function transistors and function transistors being such that conduction of the function transistors effectively halts conduction of the not function transistors;

not bit predict means connecting the not function transistors 855, 857 of the NEW DATA BIT and OLD DATA BIT pairs to said NOT BIT terminal 860;

and bit predict means connecting the function transistors 856, 858 of the NEW DATA BIT and OLD DATA BIT pairs to said BIT PREDICT TERMINAL 860.

10. A data stream editing unit according to claim 9 wherein said edit gate 119 comprises:

a plurality of edit gate blocks, at least one for each position of the selected group; each block having a power source 1107; a drain transistor 1100; bias means 1109 to bias said drain transistor for normal conduction; function transistors related to the functions NOT EDIT 1101 and EDIT 1102; two pairs of complementary not function and functions transistors OLD DATA BIT 1103, 1104 and NEW DATA BIT 1105, 1106; a GATE BIT terminal 1115 and a GATE NOT BIT terminal 1116; control means 1111–1114 connecting the function transistors 1103, 1105 of said BUS BIT pair and said NEW DATA BIT pair for conditioning by the related signals; bias means for conditioning the not function transistors 1104, 1106 for conduction;

the relationships between said control means, bias means, function transistor and not function transistor being such that conduction of the function transistor effectively halts conduction of the not function transistor;

bit gate means connecting the function transistor 1103, 1105 of the OLD DATA BIT and NEW DATA BIT to said BIT GATE terminal 1115; and not bit gate means connecting the not function transistors 1104, 1106 to said NOT BIT GATE terminal 1116.

11. An address check circuit for a system which decodes an address byte in two sections, a double-duty bit of the address byte controlling both sections, one of which relies on the double-duty bit and the other of which depends on the double-duty bit, comprising:

dependence decoding means responsive to bits including the double-duty bit for developing its primary function; dependence means for producing a DEPENDENCE signal in accordance with the double-duty bit value known to relate to the primary function developed by said dependence decoding means;

reliance decoding means responsive to bits including the double-duty bit for developing its primary function; reliance means for producing RELIANCE and NOT RELIANCE signals in accordance with the double-duty bit value known to relate to the primary function developed by said reliance decoding means; an address check trigger;

and comparison means responsive to a mismatch of DEPENDENCE and RELIANCE signals to set said check trigger.

12. An address check circuit according to claim 11, comprising, in addition:

reliance parity means for producing a modulo parity indication in accordance with address bit values known to relate to the primary function developed by said reliance decoding means; dependence parity means for producing a modulo parity indication in accordance with address bit values known to relate to the primary function developed by said dependence decoding means; and parity error means jointly responsive to said reliance parity means and said dependence parity means to control said address check means.

13. A negative logic decoder for positioning variable data with respect to a data register, comprising:

a data gate for input to said data register;

a first echelon of three level logic NEGATIVE OR blocks, one for each bit position, each having a plurality of logical inputs, a supervisory input, and a plurality of logical outputs which follow related logical inputs according to the logic of the block when enabled by the supervisory input, data position control means introducing control signals to said logical inputs, data byte applying means introducing complements of the applicable data bits to the respective supervisory inputs, a group of first echelon terminals and logical OR means connecting said NEGATIVE OR blocks to said first echelon terminals, whereby said group of first echelon terminals are individually conditioned or deconditioned according to the settings and positioning of the data byte within a data group;

and a second echelon of three level logic blocks, each block relating to similar relative positions within a plurality of data register groups, each block having a plurality of logical inputs respectively relating to specific data register positions, a plurality of supervisory inputs, a plurality of logical outputs, connection means connecting said logical outputs to specific positions of said data register via said data gate, and data position control means introducing control signals to said logical inputs and to certain of said supervisory inputs; and first echelon signal applying means connecting said first echelon singals to supervisory inputs of related second echelon OR blocks, whereby said second echelon logical outputs provide signals to said data gate according to the conditioned settings and positioning of the data byte with respect to the data register, and said second echelon drain outputs conduct according to the deconditioned settings and positioning of the data byte or the not gate condition.

14. A data stream editing unit comprising:

(*a*) a multi-position old data register which may contain old data and into which new data is to be assembled according to edit and address information;

(*b*) a byte address register for providing the location within said data register at which the new data byte is to be placed;

(*c*) a set of latches for providing gated outputs from said byte address register;

(*d*) a new data byte register;

(*e*) new data latches for providing gated outputs from said new data byte register;

(*f*) an edit register;

(*g*) edit latches for providing gated outputs from said edit register;

(*h*) first echelon means responsive to the gated outputs from said byte address register for directing gated outputs from said byte register and from said edit register to selected identical positioning within a new data group and within an edit group;

(*i*) second echelon means responsive to the gated outputs from said byte address register for directing the new data group and edit group to selected identical positioning with respect to said old data register;

(*j*) an edit gate connected to said second echelon means for entering an editing byte into the selected area of said old data register;

(*k*) an old data switch matrix responsive to the settings of said old data register and said byte address register for reading out an old data group;

(*l*) a set of old data latches for providing gated outputs from said old data switch matrix; and (*m*) a parity predictor responsive to settings of said new data latches, edit latches and old data latches to provide parity bits for the edited group to said old data register via said edit gate.

15. A data stream editing unit according to claim 14, wherein said parity predictor comprises a group of bit predict blocks, each including:

a power source; a NOT BIT PREDICT terminal; a BIT PREDICT terminal; and three pairs of complementary not function and function transistors related to the functions EDIT, OLD DATA BIT and NEW DATA BIT; bias means associated with the not function transistor in each pair to provide normal conduction of a not function signal; control means connecting function signals EDIT, OLD DATA BIT and NEW DATA BIT to respectively related function transistors;

connection means connecting said EDIT pair to provide a series path from the current source to the OLD DATA BIT pair when the EDIT function signal is deconditioned in said control means and to provide a series path from the current source to the NEW DATA BIT pair when the EDIT function signal is conditioned; the relationships of said bias means, control means, not function transistors and function transistors being such that conduction of the function transistors effectively halts conduction of the not function transistors;

not bit predict means connecting the not function transistors of the NEW DATA BIT and OLD DATA BIT pairs to said NOT BIT terminal;

and bit predict means connecting the function transistors of the NEW DATA BIT and OLD DATA BIT pairs to said BIT PREDICT TERMINAL.

16. A data editing unit comprising:

(*a*) a byte address register;

(*b*) new data byte means;

(*c*) edit byte means;

(*d*) an old data register;

(*e*) echelon means responsive to settings of said byte address register to provide access from said new data byte means and edit byte means to a selected editing group area in said old data register;

(*f*) and edit means responsive to settings of said new data byte means and edit byte means to edit the selected old data group.

17. A data editing unit according to claim 16, further comprising:

(*g*) old data readout means responsive to settings of said byte address register to read out the selected old data group;

(*h*) and a parity predictor responsive jointly to values of the selected old data group, new data byte and edit byte, derived respectively from said old data readout means, new data byte means, and edit byte means to provide parity values for the selected old data group as edited.

References Cited in the file of this patent

UNITED STATES PATENTS 2,847,919 Rosetto ---------------- Aug. 19, 1958

2,853,696 Mendelson ------------- Sept. 23, 1958